(12) United States Patent
Trestain

(10) Patent No.: US 10,275,211 B2
(45) Date of Patent: Apr. 30, 2019

(54) SOCIAL MODE SHARING OF MUSIC IN A LISTENING ROOM OF A VEHICLE

(71) Applicant: Harman International Industries, Incorporated, Stamford, CT (US)

(72) Inventor: Christopher Michael Trestain, Livonia, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 15/858,759

(22) Filed: Dec. 29, 2017

(65) Prior Publication Data

US 2018/0189024 A1 Jul. 5, 2018

Related U.S. Application Data

(60) Provisional application No. 62/440,807, filed on Dec. 30, 2016.

(51) Int. Cl.

| *G06F 3/16* | (2006.01) |
| *H04M 1/725* | (2006.01) |
| *G06F 17/30* | (2006.01) |
| *H04M 1/60* | (2006.01) |

(52) U.S. Cl.
CPC ........ *G06F 3/165* (2013.01); *G06F 17/30772* (2013.01); *H04M 1/6091* (2013.01); *H04M 1/72572* (2013.01); *H04M 1/7253* (2013.01); *H04M 1/72558* (2013.01)

(58) Field of Classification Search
CPC .............. G06F 3/165; G06F 17/30772; H04M 1/72572; H04M 1/72558; H04M 1/7253; H04R 2499/13; H04S 7/302
USPC ............ 700/94; 381/86, 61, 92, 18; 701/431
See application file for complete search history.

(56) References Cited

U.S. PATENT DOCUMENTS

| 2010/0036666 | A1* | 2/2010 | Ampunan | G06F 17/30749 704/251 |
| 2015/0143443 | A1* | 5/2015 | Boyle | H04N 21/4788 725/110 |
| 2016/0277923 | A1* | 9/2016 | Steffey | H04W 12/04 |
| 2016/0328471 | A1* | 11/2016 | Goldin | G06F 17/3074 |

* cited by examiner

*Primary Examiner* — Melur Ramakrishnaiah
(74) *Attorney, Agent, or Firm* — Brooks Kushman P.C.

(57) ABSTRACT

In at least one embodiment, an apparatus for playing back audio in a vehicle is provided. The apparatus includes an audio controller having memory for being operably coupled to a plurality of mobile devices in a vehicle. The audio controller is programmed to wirelessly receive audio data from the plurality of mobile devices and to store the audio data on memory. The audio controller is further programmed to playback the audio data via loudspeakers in the vehicle.

20 Claims, 4 Drawing Sheets

SOCIAL MODE SHARING OF MUSIC IN A LISTENING ROOM OF A VEHICLE

CROSS-REFERENCE TO RELATED APPLICATIONS

This application claims the benefit of U.S. provisional Application No. 62/440,807 filed on Dec. 30, 2016, the disclosure of which is incorporated in its entirety by reference herein.

TECHNICAL FIELD

Aspects disclosed herein generally relate to an apparatus, system or method that provides social mode sharing of audio in a listening room in a vehicle.

BACKGROUND

Audio in a vehicle is generally controlled by a driver or a front seat passenger who is within reach of the audio system. Other vehicle occupants are essentially disengaged/unable to meaningful impact the audio experience. Hence, the passengers in the vehicle may be deprived of enjoying music in the vehicle that could also be provided by other passengers in the vehicle.

SUMMARY

In at least one embodiment, an apparatus for playing back audio in a vehicle is provided. The apparatus includes an audio controller having memory for being operably coupled to a plurality of mobile devices in a vehicle. The audio controller is programmed to wirelessly receive audio data from the plurality of mobile devices and to store the audio data on memory. The audio controller is further programmed to playback the audio data via loudspeakers in the vehicle.

In at least another embodiment, a computer-program product embodied in a non-transitory computer readable medium that is programmed to playback audio in a vehicle is provided. The computer-program product includes instructions for wirelessly receiving audio data from a plurality of mobile devices in a vehicle. The computer-program product includes instructions for storing the audio data on memory and for playing back the audio data via loudspeakers in the vehicle.

In at least another embodiment, a method for playing back audio in a vehicle is provided. The method includes wirelessly receiving audio data at an audio controller from each of plurality of mobile devices in a vehicle and storing the audio data on memory. The method further includes playing back the audio data via loudspeakers in the vehicle.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits, at least one controller, processor, or other computer based devices. All references to these devices and the functionality provided by each, are not intended to be limited to encompassing only what is illustrated and described herein. While particular labels may be assigned to the foregoing devices, such labels are not intended to limit the scope of operation for the noted devices. It is recognized that the devices may be combined with each other and/or separated in any manner based on the particular type of electrical implementation that is desired.

It is recognized that any device (e.g., controller(s), processor(s), connected amplifier(s) (or audio controller), speech prompt units, etc. as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, the devices noted herein may utilize one or more microprocessors to execute a computer-program that is embodied in a non-transitory computer readable medium that is programmed to perform any number of the functions as disclosed. Further, the devices as noted herein include a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) are positioned within the housing. The controller(s) as disclosed also include hardware based inputs and outputs for receiving and transmitting data, respectively to and from other hardware based devices as discussed herein.

Figure 1:
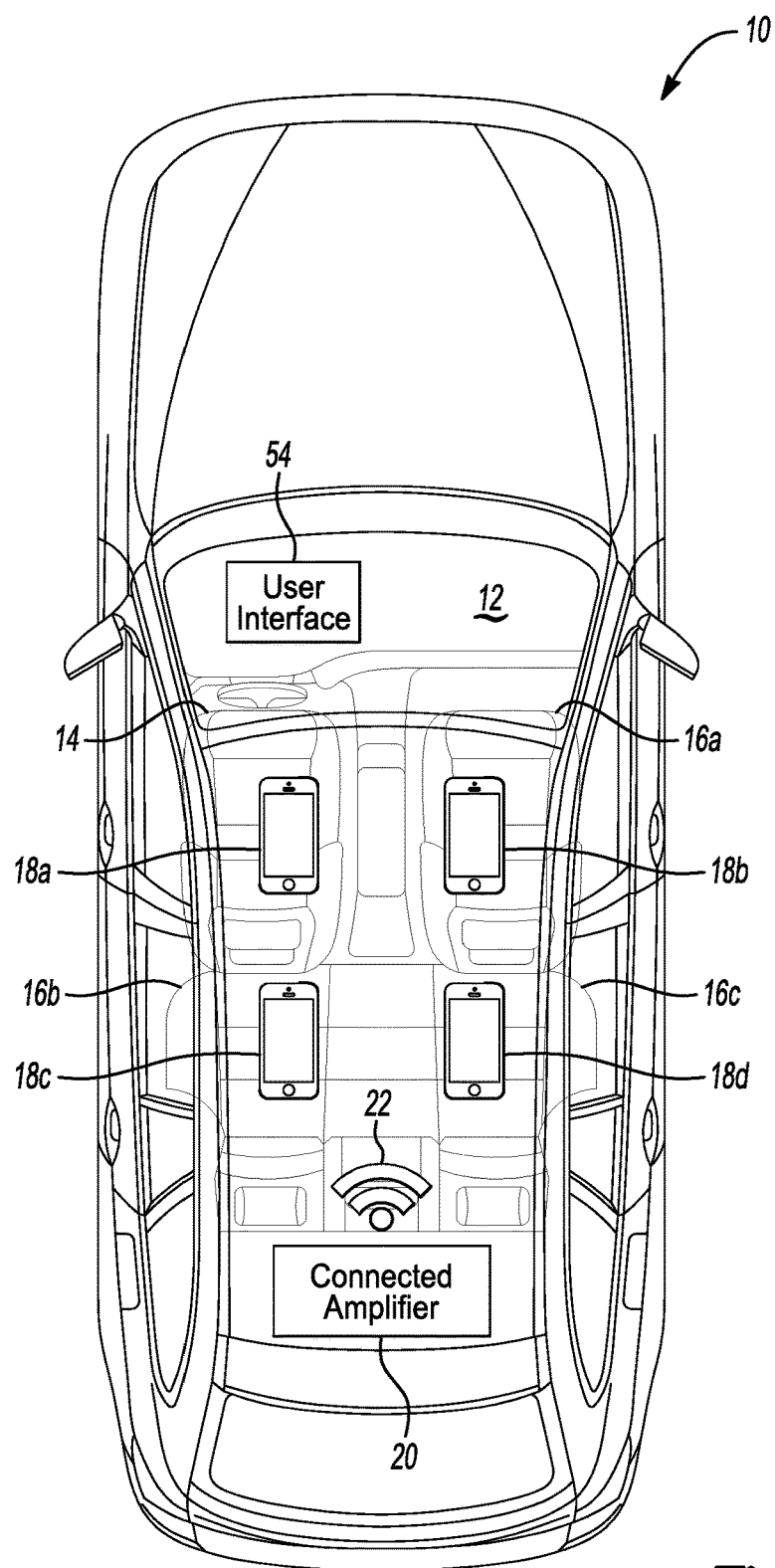
FIG. 1 depicts a vehicle including a system that provides social sharing of audio in a listening room in a vehicle in accordance to one embodiment.

FIG. 1 depicts a vehicle 10 including a system 12 that provides social sharing of audio in a listening room in accordance to one embodiment. The vehicle 10 includes a driver (not shown) positioned in a driver seat 14 and various other passengers (not shown) each being positioned in a corresponding passenger seat 16a-16c ("16"). The driver may include a mobile device 18a while the remaining passengers in the vehicle 10 may also include mobile devices 18b-18d. It is recognized that the vehicle 10 may include any number of passenger seats 16. It is also recognized that the mobile device 18 may be a cell phone, tablet, laptop, or other suitable device that is arranged to playback audio (or music) and/or transmit data corresponding to the audio to the vehicle 10.

The system 12 includes a connected amplifier (or audio controller) 20 and a wireless transceiver 22 positioned in vehicle 10. The connected amplifier 20 may generally include various electronics to communicate bi-directionally with the mobile devices 18 in the vehicle 10 via the wireless transceiver 22. The wireless transceiver 22 may be a WiFi® based transceiver or any other device that is suitable to establish a data link between the vehicle 10 and the mobile devices 18 positioned in the vehicle 10. It is recognized that the connected amplifier 20 and the wireless transceiver 22 may be implemented as a standalone unit. Alternatively, the connected amplifier 20 and the wireless transceiver 22 may be separate devices. A user interface 54 such as a touch screen may enable a driver to control the connected amplifier 20 for purposes of playing audio back in the vehicle 10.

The connected amplifier 20 may be an audio head unit that provides the audio data to various loudspeakers (not shown) positioned throughout the vehicle 10. Each occupant in the vehicle 10 (i.e., driver and/or passengers) can upload or transmit any audio data from their respective mobile device 18 to the connected amplifier 20 via the wireless transceiver 22. The connected amplifier 20 includes memory (not shown) for storing the audio data from the various mobile devices 18 in the vehicle 10. Thus, the system 12 enables multiple mobile devices 18 to connect to the audio system of the vehicle 10 as opposed to a single Bluetooth® based connection. Each mobile device 18 may execute a companion application (or "companion app") to enable transmission of the audio data from the various vehicle occupants (i.e., the various mobile devices) to the wireless transceiver 22 and connected amplifier 20 for audio playback.

The connected amplifier 20 may store and queue each audio file in a first in/first out (FIFO) basis format. The user interface 54 and/or the connected amplifier 20 may grant the driver master privileges such as a master override control to skip or delete the audio files (e.g., songs) from the queue of audio files. Since the companion app on each mobile device 18 enables access to all of the music content (or audio data) on the mobile device 18 to the connected amplifier 20, the connected amplifier 20 is programmed to provide automatic/smart playlists that may be partitioned or separated from one another based on the corresponding genre or other descriptive information of a song while collected from the mobile device(s) 18.

In addition, the connected amplifier 20 and the wireless transceiver 22 may be arranged to receive high resolution uncompressed audio from the mobile devices 18. It is also recognized that the mobile device 18 (and companion app) enables a vehicle occupant to control the tactile output of a tactile based transducer to emphasis the amount of force that coincides with the frequency of the audio data to simulate the movie theater experience. While not shown, each seat may include a corresponding tactile transducer that is positioned to a frame thereof. The tactile transducer may provide the sensation to the passenger that more bass (or low frequency) is present in the audio output by virtue of the presence of the tactile output. The vehicle occupant can control the amount of tactile feedback provide by the tactile transducer through their respective mobile device 18 via the user interface 54. An example of the manner in which a vehicle occupant may control the tactile output of the tactile based transducer is set forth in U.S. provisional application No. 62/439,699 as filed on Dec. 28, 2016 which is hereby incorporated in reference by its entirety.

When a passenger disconnects his/her mobile device 18 from the vehicle 10, the connected amplifier 20 removes the audio data as provided by such a mobile device 18 to the vehicle 10 will be removed from the queue of audio data stored within the connected amplifier 20. It is recognized that the system 12 may be easily linked to an external content providers such a SPOTIFY® or TIDAL® or other suitable content provider to access songs that aren't necessarily stored on the physical memory of the various mobile devices 18.

Figure 2:
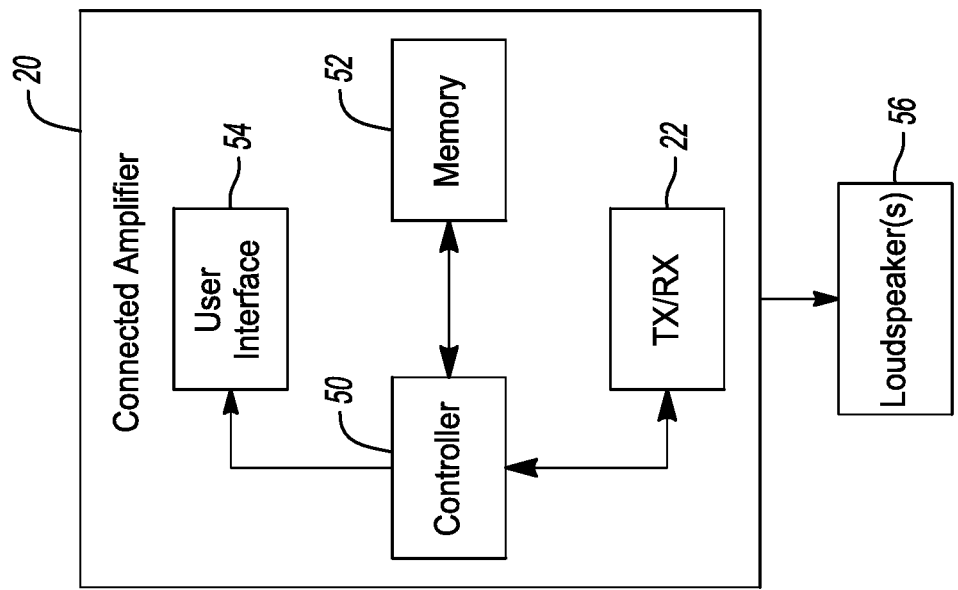
FIG. 2 depicts a more detailed implementation of a mobile device and a connected amplifier in accordance to one embodiment.
Figure 2:
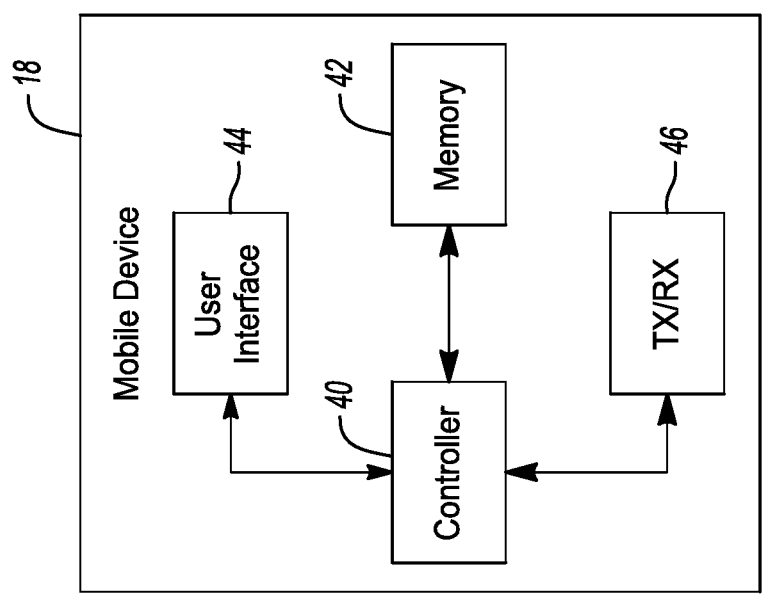

FIG. 2 depicts a more detailed implementation of the mobile device 18 and the connected amplifier 20 in accordance to one embodiment. The mobile device 18 generally includes a controller 40, memory 42, a user interface 44, and a transceiver 46. The memory 42 is generally configured to store any number of songs (i.e., audio data). The user interface 44 enables the vehicle occupant to select one or more of the songs that are stored on the mobile device 18 that are to be transmitted to the connected amplifier 20. The controller 40 interfaces with the memory 42 and the transceiver 46 to transmit the selected audio data from the mobile device 18 to the connected amplifier 20. The mobile device 18 and the connected amplifier 20 may wirelessly communicate with one another via BLUETOOTH®, WiFi®, or other suitable data communication link. The memory 42 stores instructions for execution by the controller 40 to enable the vehicle occupant to select the desired audio data and to wireless transmit the same to the connected amplifier 20 for playback in the vehicle 10. The memory 42 also stores instructions for execution by the controller 40 to provide the companion app on the mobile device 18 to enable access to the audio data on the mobile device 18.

The connected amplifier 20 generally includes a controller 50, memory 52, the user interface 54, and the transceiver 22. The transceiver 22 of the connected amplifier 20 receives the selected audio data from the mobile device 18. The memory 52 stores the selected audio data from the mobile device 18 thereon. As noted above, the memory 52 stores the selected audio data from the various mobile devices 18a-18d on a first in basis (or as sequentially received by the various mobile devices 18a-18d). The controller 54 controls the playback of the stored audio data based on the order in which the selected audio data is received from the various mobile devices 18a-18d. The memory 52 stores instructions for execution by the controller 50 to perform any of the operations performed by the connected amplifier 20 as disclosed herein. Any number of loudspeakers 56 may be operably coupled to the connected amplifier 20 for audibly playing back the stored audio data on the connected amplifier 20.

Figure 3:
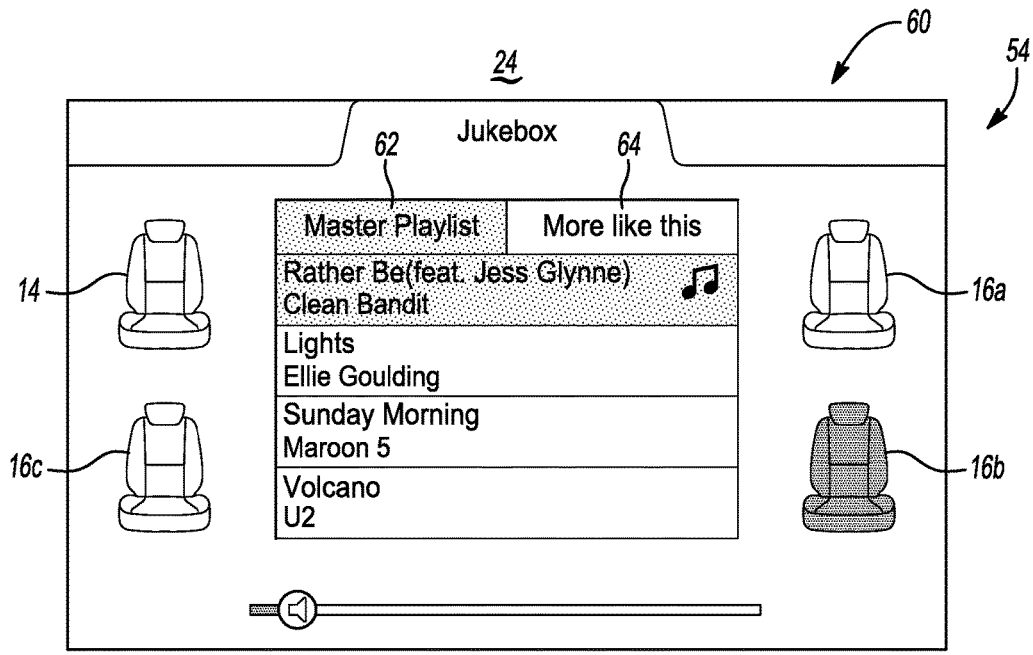
FIG. 3 depicts an example of vehicle display in accordance to one embodiment.

FIG. 3 depicts an example of a vehicle display 60 for the user interface 54 in accordance to one embodiment. The display 60 provides a Master Playlist tab 62 that includes various songs provided by the various mobile devices 18 in the vehicle 10. The Master Playlist tab 62 may include a listing of songs that are stored in the queue of the connected amplifier 20 referenced above. The driver (or other vehicle passenger) is generally enabled to select a song for playback in the vehicle 10 from the Master Playlist tab 62. In addition, the display 60 includes a More like this tab 64 that is selectable by the driver (or other vehicle passenger who is capable of selecting the tab). In the event, one or more vehicle passengers would like to listen to a song of the same genre that is currently being played back, the driver/passenger(s) can select the More like this tab 64 to gain access to other songs that belong to the same genre of the song that is being played back. It is recognized that the connected amplifier 20 may play back the audio data that is selected by the driver as a first priority. In the event the driver has not selected a particular song to playback, the connected amplifier 20 may automatically play back the audio data in the order or sequence in which the audio data is stored therein from the various mobile devices 18.

The vehicle display 60 provides a graphical representation of the vehicle seats 14 and 16a-16c thereon. The seat 14 may represent the driver seat, the seat 16a may represent a right front passenger seat, the seat 16b may represent a left rear passenger seat, and the seat 16c may represent a right rear passenger seat. When a particular song is being played back, the corresponding seat 14, 16 that provided the song to the vehicle 10 is highlighted to show which occupant in the vehicle 10 was the source of the song. Likewise, the driver may select a corresponding seat 14, 16 in which an occupant is located and select the same to have songs on that particular occupant's mobile device 18 upload their respective songs assuming that the mobile device 18 has given the vehicle 10 authorization to do so. A command may be transmitted from the vehicle 10 via the wireless transceiver 22 to the corresponding mobile device 18 that is located in the desired seat 14 or 16a-16c. The connected amplifier 20 determines the location of the mobile device 18 in the vehicle 10 based on a signal strength of the signals received from the various mobile devices 18 positioned in the vehicle 10.

Figure 4:
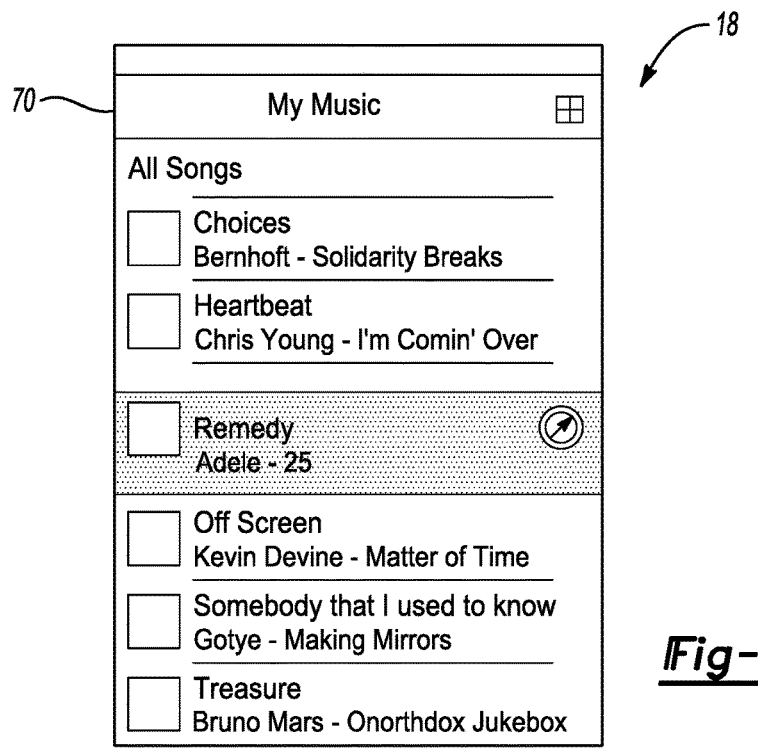
FIG. 4 depicts an example of a display on mobile device of a vehicle occupant in accordance to one embodiment.

FIG. 4 depicts an example of a display 70 of the user interface 44 on the mobile device 18 of a vehicle occupant in accordance to one embodiment. As shown, the display 70 may provide a listing of songs that can be transmitted to the vehicle 10.

Figure 5:
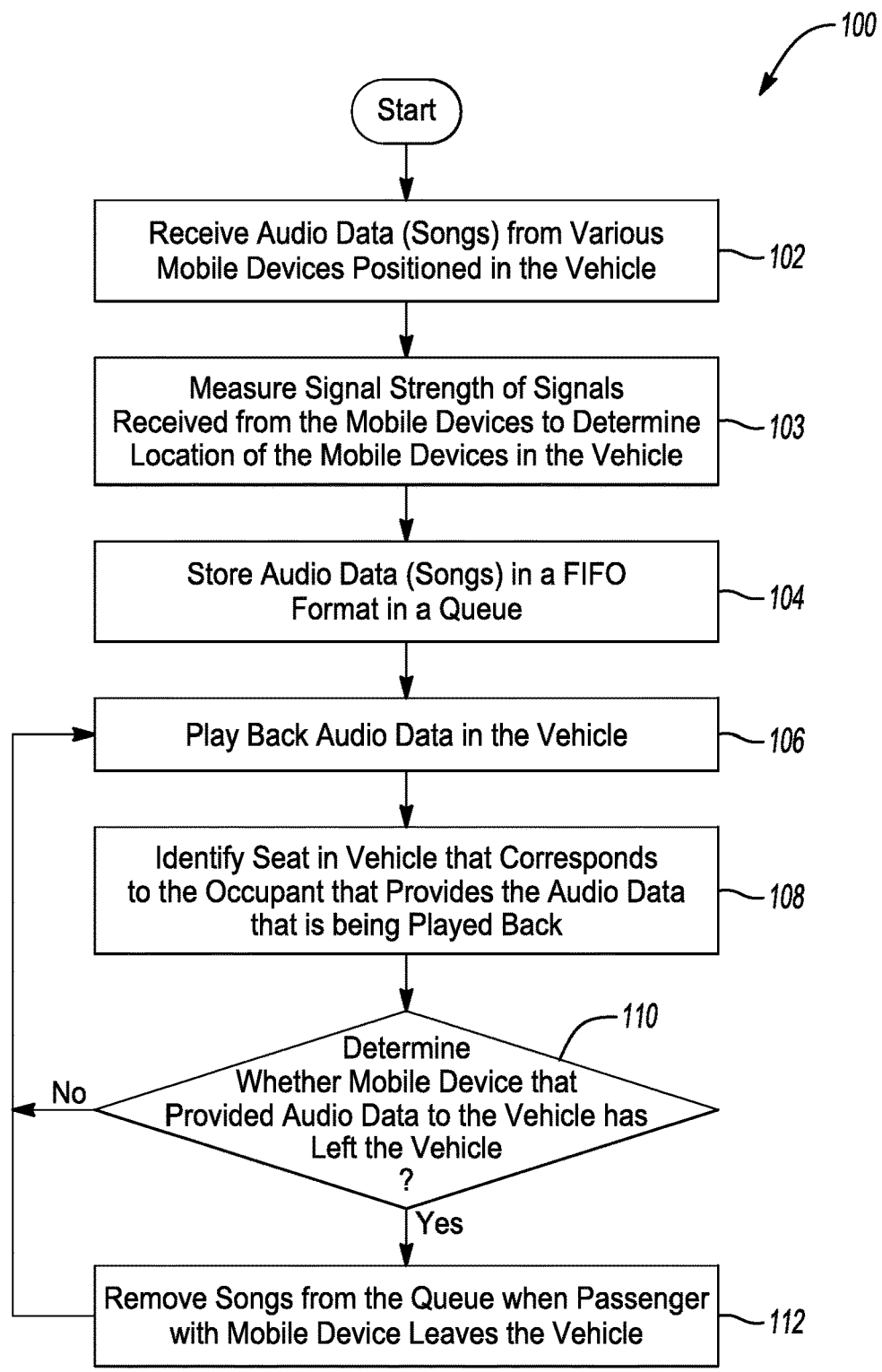
FIG. 5 depicts a method for providing social sharing of audio in the listening room of the vehicle in accordance to one embodiment.

FIG. 5 depicts a method 100 for providing social sharing of audio in the listening room of the vehicle in accordance to one embodiment.

In operation 102, the connected amplifier 20 receives audio data (or songs) from the various mobile device 18 (via the wireless transceiver 22) positioned throughout the vehicle 10.

In operation 103, the connected amplifier 20 measures a signal strength for the various signals received from the various mobile devices 18 positioned in the vehicle 10. The connected amplifier 20 determines the location of the mobile devices 18 within the vehicle 10 based on the measured signal strength. The connected amplifier 20 associates the location of the mobile device 18 in the vehicle 10 to the stored audio data that is provided by the corresponding mobile device 18.

In operation 104, the connected amplifier 20 stores the songs in memory thereof in the queue in a first in/first out format.

In operation 106, the connected amplifier 20 plays back the received audio data from the various mobile devices 18. For example, the connected amplifier 20 plays back the audio data based on driver selection via the user interface 54 as noted above. Alternatively, if the driver does not select a particular song via the user interface 54, the connected amplifier 20 plays back the audio data based on the order in which the audio data has been received from the mobile device 18.

In operation 108, the connected amplifier 20 identifies a corresponding seat (14 or 16a-16c) to the vehicle occupant that provides the audio data that is being played back. For example, the connected amplifier 20 transmits a signal to the user interface 54 corresponding to the seat (or vehicle occupant) that provided the audio data to the user interface 54. The user interface 54 then identifies the vehicle occupant that provides the audio data that is being played back by the connected amplifier 20. As noted above, the vehicle display 60 provides a graphical representation of the vehicle seats 14 and 16a-16c thereon an visually identifies the seat 14 or 16a-16c that provides the audio data that is being played back by the connected amplifier 20.

In operation 110, the connected amplifier 20 determines whether any one or more of the mobile devices 18a-18d are wirelessly coupled thereto. For example, the connected amplifier 20 monitors whether any of the mobile devices 18a-18d have left the vehicle 10. If the connected amplifier 20 has determined that any of the mobile devices 18a-18d have not left the vehicle 10 (i.e., any of the mobile devices 18a-18d are not electrically coupled to the connected amplifier 20) then the method 100 moves to operation 106 where the vehicle 10 continues to play back audio data. If the connected amplifier 20 has determined that any of the mobile devices 18a-18d have left the vehicle 10, then the method 100 moves to operation 112.

In operation 112, the connected amplifier 20 removes songs from the queue that were provided from a particular mobile device 18 that is no longer positioned in the vehicle 10 (i.e., the vehicle passenger that has the mobile 18 device leaves the vehicle 10). Alternatively, the connected amplifier 20 transmits a signal to the user interface 54 so that the user interface 54 provides a prompt for the driver to selectively remove the songs from the queue that belong to the driver who has decided to leave the vehicle 10. In this case, the driver and any other vehicle occupant that remains in the vehicle 10 may be able to listen to the audio data (or songs) provides from the occupant who left the vehicle 10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for playing back audio in a vehicle, the apparatus comprising:
   an audio controller including memory for being operably coupled to a plurality of mobile devices in a vehicle, the audio controller is programmed to:
   wirelessly receive audio data from the plurality of mobile devices;
   store the audio data on memory; and
   playback the audio data via loudspeakers in the vehicle,
   wherein the audio controller is further programmed to determine a location for a first mobile device of the plurality of mobile devices in the vehicle.

2. The apparatus of claim 1 wherein the audio controller is further programmed to playback the audio data sequentially via the loudspeakers based on an order in which the audio data from each of the plurality of mobile devices is stored on the memory.

3. The apparatus of claim 1 wherein the audio controller is further programmed to wirelessly receive the audio data from each of the plurality of mobile devices via one of Bluetooth or WiFi.

4. The apparatus of claim 1 wherein the audio controller is further programmed to transmit a first signal to a user interface corresponding to the location of the first mobile device.

5. The apparatus of claim 4 wherein the audio controller is further configured to transmit the first signal to the user interface corresponding to the location of the first mobile device while the audio controller plays back first audio data stored thereon from the first mobile device.

6. The apparatus of claim 5 wherein the user interface provides an indication of the location of the first mobile device in response to the first signal.

7. The apparatus of claim 1 wherein the audio controller is further configured to remove first audio data as provided from a first mobile device from a queue thereof in response to determining that the first mobile device is no longer electrically coupled to the audio controller.

8. A computer-program product embodied in a non-transitory computer readable medium that is programmed to playback audio in a vehicle, the computer-program product comprising instructions to:
  wirelessly receive audio data from a plurality of mobile devices in a vehicle;
  store the audio data on memory;
  playback the audio data via loudspeakers in the vehicle; and
  determine a location for a first mobile device of the plurality of mobile devices in the vehicle.

9. The computer-program product of claim 8 further comprising instructions to playback the audio data sequentially from the memory via the loudspeakers based on an order in which the audio data from each of the plurality of mobile devices is stored on the memory.

10. The computer-program product of claim 8 further comprising instructions to wirelessly receive the audio data from each of the plurality of mobile devices via one of Bluetooth or WiFi.

11. The computer-program product of claim 8 further comprising instructions to transmit a first signal to a user interface corresponding to the location of the first mobile device.

12. The computer-program product of claim 11 further comprising instructions to transmit the first signal to the user interface corresponding to the location of the first mobile device to provide an indication of the location of the first mobile device while playing back the audio data for the first mobile device.

13. The computer-program product of claim 8 further comprising instructions to remove first audio data as provided from a first mobile device from a queue thereof in response to determining that the first mobile device is no longer electrically coupled to an audio controller.

14. A method for playing back audio in a vehicle, the method comprising:
  wirelessly receiving audio data at an audio controller from each of a plurality of mobile devices in a vehicle;
  storing the audio data on memory;
  playing back the audio data via loudspeakers in the vehicle; and
  determining a location for a first mobile device of the plurality of mobile devices in the vehicle.

15. The method of claim 14 further comprising playing back the audio data sequentially from the memory via the loudspeakers based on an order in which the audio data from each of the plurality of mobile devices is stored on the memory.

16. The method of claim 14 further comprising transmitting a first signal to a user interface corresponding to the location of the first mobile device.

17. The method of claim 16 further comprising transmitting the first signal to the user interface corresponding to the location of the first mobile device to provide an indication of the location of the first mobile device while playing back the audio data for the first mobile device.

18. An apparatus for playing back audio in a vehicle, the apparatus comprising:
  an audio controller including memory for being operably coupled to a plurality of mobile devices in a vehicle, the audio controller is programmed to:
    wirelessly receive audio data from the plurality of mobile devices;
    store the audio data on memory;
    playback the audio data via loudspeakers in the vehicle; and
    remove first audio data as provided from a first mobile device from a queue thereof in response to determining that the first mobile device is no longer electrically coupled to the audio controller.

19. A computer-program product embodied in a non-transitory computer readable medium that is programmed to playback audio in a vehicle, the computer-program product comprising instructions to:
  wirelessly receive audio data from a plurality of mobile devices in a vehicle;
  store the audio data on memory;
  playback the audio data via loudspeakers in the vehicle; and
  remove first audio data as provided from a first mobile device from a queue thereof in response to determining that the first mobile device is no longer electrically coupled to an audio controller.

20. A method for playing back audio in a vehicle, the method comprising:
  wirelessly receiving audio data at an audio controller from each of a plurality of mobile devices in a vehicle;
  storing the audio data on memory;
  playing back the audio data via loudspeakers in the vehicle; and
  removing first audio data as provided from a first mobile device from a queue thereof in response to determining that the first mobile device is no longer electrically coupled to an audio controller.

* * * * *